United States Patent [19]

Bednář

[11] 4,165,657

[45] Aug. 28, 1979

[54] MULTISTAGE AUTOMATIC TRANSMISSION

[75] Inventor: Jiří Bednář, Lanska, Czechoslovakia

[73] Assignee: Povazske strojarne, narodni podnik, Povazska Bystrice, Czechoslovakia

[21] Appl. No.: 888,625

[22] Filed: Mar. 21, 1978

Related U.S. Application Data

[63] Continuation-in-part of Ser. No. 845,590, Oct. 26, 1977, abandoned.

[30] Foreign Application Priority Data

Oct. 26, 1976 [CS] Czechoslovakia .................. 6873-76

[51] Int. Cl.² ............................................. F16H 3/08
[52] U.S. Cl. .................................. 74/329; 74/665 Q; 74/665 P; 192/105 CD; 180/207; 192/45; 192/105 CE
[58] Field of Search ............. 74/329, 325, 330, 665 L, 74/665 N, 665 Q, 665 P; 180/33 C, 33 B, 33 R; 192/105 CD, 105 CE, 103 B

[56] References Cited

U.S. PATENT DOCUMENTS

| | | | |
|---|---|---|---|
| 2,529,919 | 11/1950 | Cunningham | 192/105 CE |
| 2,596,391 | 5/1952 | Farinelli | 180/33 C |
| 2,760,385 | 8/1956 | Fuchs | 74/665 Q |
| 3,224,541 | 12/1965 | Yamamoto | 192/105 CD |

*Primary Examiner*—Benjamin W. Wyche
*Assistant Examiner*—Wesley S. Ratliff, Jr.

[57] ABSTRACT

A multistage automatic countershaft transmission adapted for mutually independently shifting the first and second phases of the gears of a transmission to thereby effectuate a smooth gear change within a narrower range of speeds. The countershaft transmission gear is provided with a driving gear which is rotatably supported on a hub, connected to the drum of a gear change clutch, and in engagement with an idle gear supported on a countershaft upon which a countershaft wheel is fixed. The hub and the driven gear are firmly connected and rotatably supported on an output shaft. A carrier of shoes of a gear change clutch is fixed to the hub, the shoes being provided with one or more carrier elements and by means of the carrier elements engage a regulating carrier which is fixed to the output shaft and is provided with an engagement edge, a driving edge, and a rest surface. A combined gear starting and an idle gear are freely rotatably supported on the countershaft, the starting gear being in engagement with a starting device. The idle gear forms a part of an over-running clutch; in recesses of the idle gear there are guided idle clutch bodies, extensions of the starting gear, and disengaging studs, which are part of extensions of the starting gear. Spring biased plunger pins constantly urge the idle bodies toward their separating or non-driving position. The shoes of the gear change clutch are axially guided by the regulating carrier, against which guiding surfaces of the carrier element fixed to a shoe rest.

3 Claims, 5 Drawing Figures

MULTISTAGE AUTOMATIC TRANSMISSION

This application is a continuation-in-part of application Ser. No. 845,590, filed Oct. 26, 1977 now abandoned.

BACKGROUND OF THE INVENTION

The invention relates to a multistage automatic countershaft transmission having speed stages which can be changed by means of centrifugal clutches. The transmission of the invention is particularly suitable for motor vehicles.

The automatic countershaft transmission gears of the state of the art have speed stages that can be changed by means of centrifugal clutches. However, these known mechanisms have not proved to be completely satisfactory. For example, the start of the gear change does not depend on the load of the engine; the first phase of the gear change lies within the speed range $v_1$ to $v_2$ ($v_1$ being the speed range at which a forceless contact of friction parts of the clutch takes place; $v_2$ being the speed, at which the gear change clutch transmits the full torque with slippage via a higher transmission stage, relative to which it is changed); and the second phase of gear change lies within the speed range $v_2$ to $v_3$ ($v_3$ being the speed range wherein a rigid connection of the gear change clutch takes place). These speeds are mutually dependent and therefore, from the point of view of continuity of movement, a wide speed range $v_2$ to $v_3$ of the second phase of gear change (which takes place upon a drop of the number of revolutions of the engine from $n_2$ at the speed $v_2$ to $n_3$ at the speed $v_3$) unnecessarily widens the speed range between $v_1$ and $v_2$ of the first phase of gear change. Therefore, the speed range of the vehicle between $v_1$ to $v_3$, where the efficiency of transmission of power is reduced due to slippage of the gear change clutch, becomes larger with an unsuitable course of transmitted forces for driving the vehicle in dependence on its speeds. Such prior transmission gears are also not suitable for more than two speed stages.

SUMMARY OF THE INVENTION

It is an object of the invention to eliminate to a high degree the drawbacks of existing countershaft transmission gears and to provide a transmission gear wherein the range of speeds in the course of a change of gears, during which the efficiency of transmission of power is reduced, is narrowed.

According to this invention the countershaft transmission gear is provided with a driving gear which is rotatably supported on a hub and is connected to the drum of a gear change clutch and is in engagement with an idle gear supported on a countershaft on which a countershaft gear is fixed. The hub and the driven gear are firmly connected and are rotatably supported on the output shaft; a carrier of shoes of a gear change clutch is fixedly mounted on the hub. The clutch shoes are provided with one or more carrier elements, and by means of these carrier elements are in engagement with a regulating carrier fixed to the output shaft and provided with an engagement edge, a driving edge, and a rest surface. A starting gear together with the idle gear are freely rotatably supported on the countershaft and are in engagement with a starting device. Guided idle clutch members of an over-running clutch are mounted in recesses of the idle gear. Extensions of the starting gear project into recesses in the idle gear and form disengaging studs. Spring biased plunger pins are mounted in the idle gear, such pins constantly urging the idle clutch members toward their disengaged or non-driving position, the idle members being disposed between the pins and the disengagement studs. The shoes of the gear change clutch are axially guided by the regulating carrier, against which the guiding surfaces of the carrier element fixed to the output shaft bear.

The advantages of the multistage automatic countershaft transmission according to this invention resides in the excellent operating properties of the transmission due the mutual independence of the first and second phase of gear change which makes possible a reduction of the width of the range of speeds $v_1$ to $v_3$ of the gear change to a minimum. Thus advantageously three and more stage transmission gears can be provided in the transmission. The speed $v_1$ at the start of gear change is reduced with a reduced load of the engine. In case of a proper design of the transmission a "kick-down" effect occurs within a selected range of the transmission gears. It is also possible to brake by means of the engine at the maximum speed of the vehicle up to a speed where the starting clutch is disengaged. The transmission transmits the torque where the vehicle is pushed to the starting clutch upwards from a selected speed $v_p$. When the transmission is to be used in a motorcycle, starting can be effected by means of the transmission without turning the driving gear of the vehicle. The transmission, when provided with a cut-off for the driving mechanism and with no starting device, also can perform automatically all functions required for transmissions for mopeds.

DESCRIPTION OF DRAWINGS

The attached drawings illustrate a preferred embodiment of the invention together with a diagram indicating its properties in operation.

DESCRIPTION OF A PREFERRED EMBODIMENT

Figure 2:
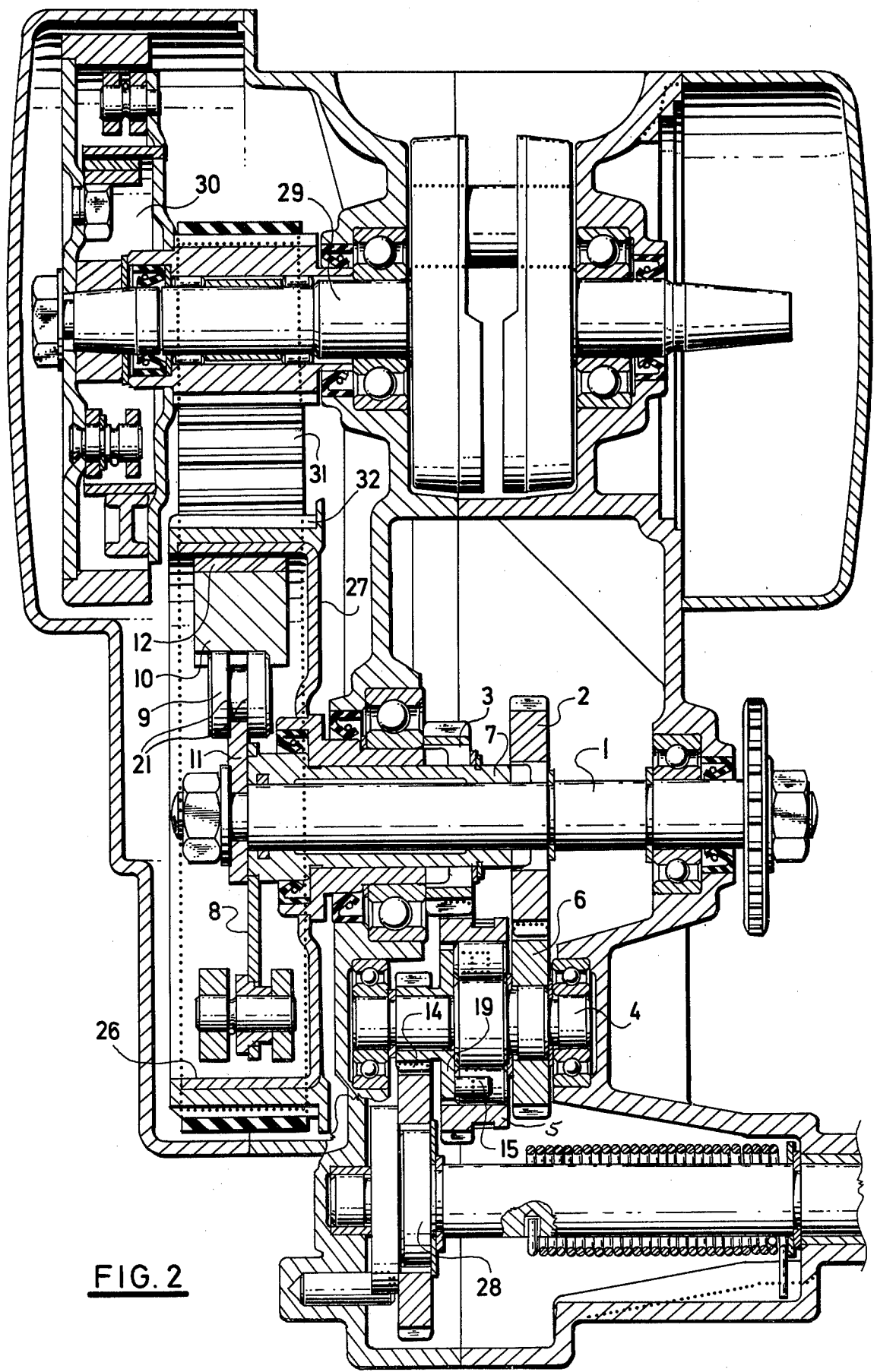
FIG. 2 is a view in longitudinal axial section of an embodiment of the transmission gear according to this invention adapted for use with a single track vehicle such as a motorcycle, scooter, or moped.
Figure 4:
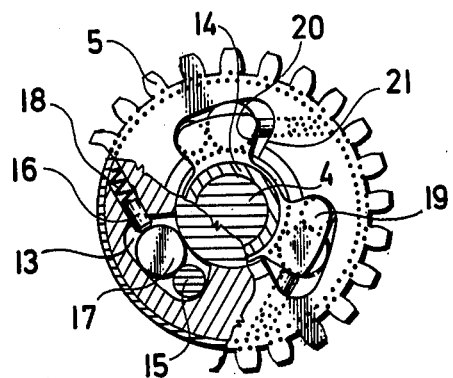
FIG. 4 is a view partly in cross section and partly in elevation of the idle gear and of the starting gear, the section being taken along the line 4—4 in FIG. 3.
Figure 5:
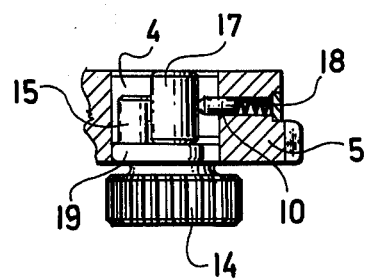
FIG. 5 is a view partially in section and partially in elevation of the portion of the idle gear which has a recess, the section being taken along the line 5—5 in FIG. 4.
Figure 3:
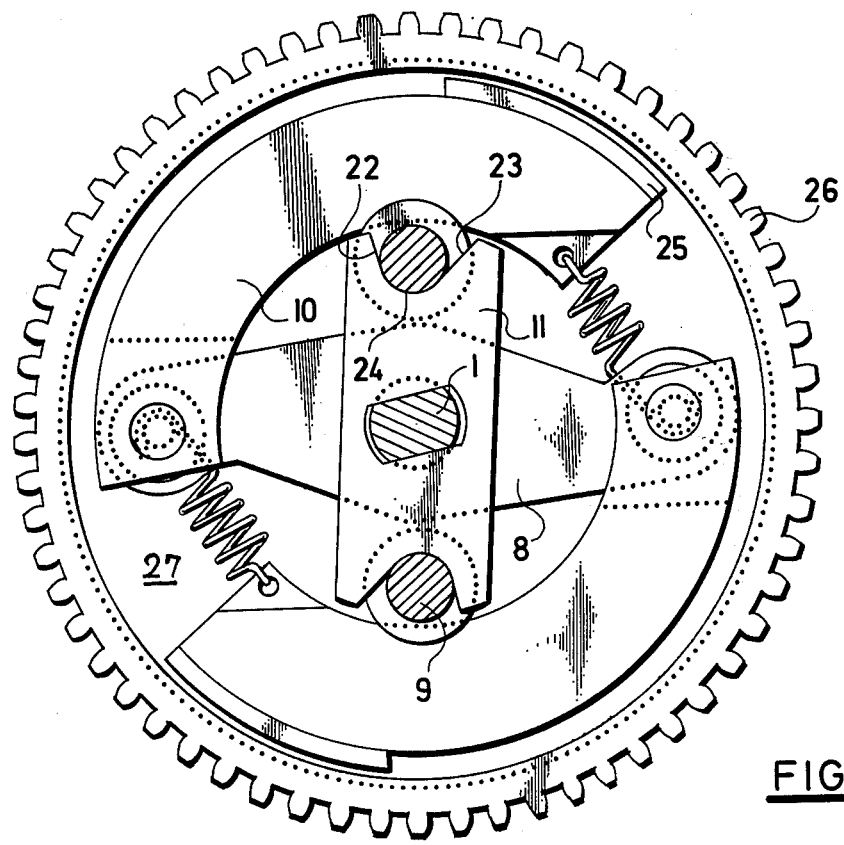
FIG. 3 is a view partly in cross section and partly in elevation of the gear change clutch, the section being taken along the line 3—3 in FIG. 2.

Turning first of FIG. 2, torque from the crank shaft 29 of the engine is transmitted via a starting clutch 30 to a cogged or "Timing" belt 31 of the primary transmission stage. A toothed rim 32 over which belt 31 runs forms part of the external surfaces of a drum 27 of a centrifugal gear change clutch 12. The drum 27 is fixedly connected to the driving gear 3 of the transmission. The driving gear 3 meshingly engages with an idle gear 5 which is supported on a countershaft 4, which is fixedly connected to a countershaft gear 6. The driving gear 3 is rotatably supported on a sleeve or hub 7 fixed to a driven gear 2. The hub 7 and the driven gear 2 are rotatably supported on the output shaft 1. A carrier 8 of centrifugally actuated shoes 10 of the gear change clutch 12 is fixed to the hub 7. Shoes 10 are constantly urged radially inwardly away from drum 27 by coil tension springs 31 (FIG 3). The carrier is provided with carrier elements 9 which are in engagement with a regulating carier member 11 fixedly mounted on the output shaft 1.

The member 11 is provided with an engagement edge 22, with a driving edge 23 and with a rest surface 24 (see FIG. 3). The driving edge 23 is shaped so that in case of transmission of the torque from the output shaft 1 to the gear change clutch 12 (that is when the vehicle moves forwardly without drive from the engine, i.e., when the engine is started by pushing the vehicle and when the vehicle is braked) the linings 25 of the shoes 10 contact the working surfaces 26 of the drum 27 of the gear change clutch 12, whereby the output shaft 1 is firmly connected with the drum 27 of the gear change clutch 12 by means of the shoes 10. The engagement edge 22 is shaped so that a force is generated by the torque from the engine and transmitted from the transmission gears via the hub 7 and via the carrier 8 of the shoes 10 to carrier elements 9. This force reduces the effect of the centrifugal force of shoes 10 of the gear change clutch 12 according to the magnitude of the torque transmitted from the transmission.

The idle gear 5 with the starting gear 14 are freely rotatably supported on the countershaft 4 and are in engagement with the starting device 28. When the idle gear 5 freely rotates on the countershaft 4 it can be operatively connected to the starting gear 14. This connection is affected by engagement of the studs 15 on the starting gear 14 into recesses 13 of the idle gear 5, so that the idle bodies 17 are urged against the disengagement studs 15 by springs 18 via plunger pins 16. When starting by means of the starting device 28, the starting gear 14 is operatively connected with the idle gear 5 by means of extensions 19 engaging into recesses 13 of the idle gear 5 so that the rest surface 20 of extensions 19 is in engagement with the guiding surface 21 of the recess 13 of the idle gear 5, whereby the idle bodies 17 are disengaged by means of disengagement studs 15. The shoes 10 of the gear change clutch 12 are axially guided by the regulating carrier 11, against the guiding surfaces 21 of which the carrier element 9 fixed on the shoe 10 rest.

Figure 1:
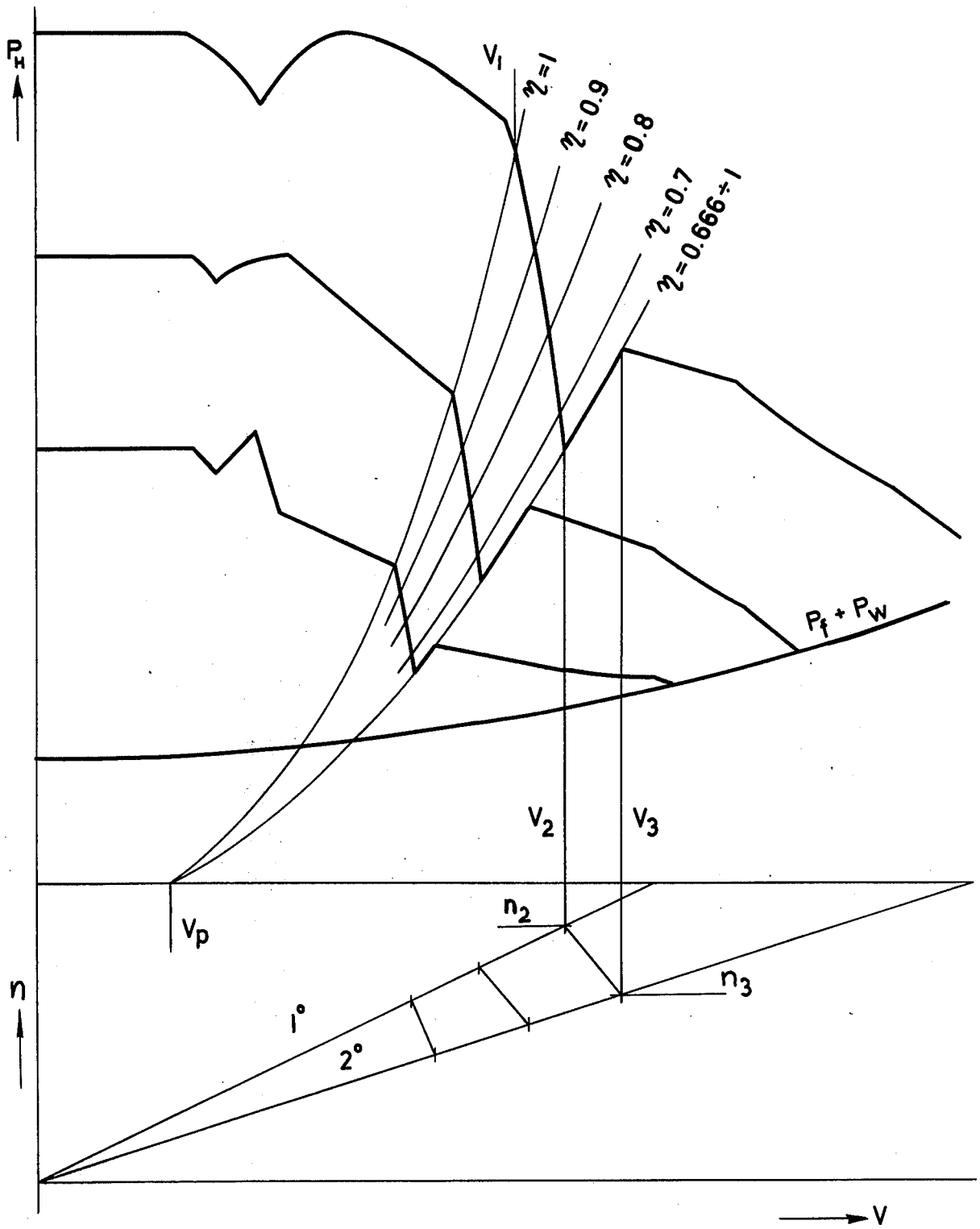
FIG. 1 is a two-part diagram, the lower part of the diagram illustrating the efficiency of transmission of power ($\eta$) as a function of vehicle speed (v) in the course of gear changes for a transmission ratio of 1 to 1.5, and the upper part of the diagram illustrating the course of the driving for $P_H$ in dependence upon the vehicle speed v when transmitted by a two-stage automatic countershaft transmission in accordance with the invention for three different loads on the engine.

FIG. 1 illustrates in its lower part the course of efficiency η of transmission of power and of the number of revolutions of the engine in dependence on the speed v of the vehicle particularly the course in case of a gear change from speed $v_1$ to $v_3$, and in its upper part FIG. 1a illustrates the course of the driving forces $P_H(P_H=P_f+P_w$, where $P_f$ is frictional resistance, and $P_w$ is air resistance) for different loads of the engine, the course of driving resistance $P_f=P_w$.

The above-described transmission operates as follows:

The drive force which is received from the transmission is not transmitted from the carrier 8 directly to the output shaft 1, but the hub 7 of the carrier 8 is rotatably supported on the output shaft 1 and the driving force is transmitted from the carrier 8 by means of the shoes 10 swingably suspended on the carrier 8 so that the drive force of the lower and higher transmission ratio is transmitted from the carrier elements 9 fixed to shoes 10 by the regulating carrier member 11 fixed to the output shaft 1 and the drive force transmitted by the regulating carrier member 11 reacts back on the shoes 10 of the gear change clutch 12.

In case of starting by the starting device 28 by way of the transmission, the free wheel or over-running clutch between the idle gear 5 and the countershaft 4 is brought out of engagement by the disengagement bolts 15 of the starting wheel 14, which bolts 15 at the start shift the idle clutch bodies 17 against the force of springs 18 out of driving engagement (the springs 18 urge by way of the pins 16 the idle bodies 17 into engagement with the idle gear 5 and with the countershaft 4) and the extensions 19 of the starting gear 14 take along the ile gear 5 of the countershaft 4. Thus at starting by the starting device 28 only a part of the transmission connected with the motor is turned and the countershaft 4, rotatably connected with the output shaft 1 is at rest, thereby enabling single track motor vehicles (motorcycles, mopeds and the like) to start without turning the driven wheel of the vehicle and thus without lifting the driven wheel from the roadway, as by placing the vehicle on a stand.

By providing a shoulder on the carrier elements 9 guiding surfaces 21 are created, which are used for the axial guiding of shoes 10 by the regulating carrier member 11 fixed to the output shaft 1.

The novel effects of the arrangement are a reduction of the speed range of gear shifting to a minimum at constant load of the motor without jeopardizing smooth gear shifting when shifting to higher speeds of the vehicle with an increased motor load, the possibility of shifting to a lower transmission stage by increasing the motor load (kick-down effect) and shifting from a lower transmission stage to a higher transmission stage by reduction of the motor load, the possibility of braking by the motor from a maximum speed up to a reduction of the speed of the vehicle to a speed where the starting clutch 30 becomes disengaged, and the possibility of starting the motor by pulling the vehicle, as will appear from the following description.

In the case of cutting in the lower transmission stage, the drive power from the drum 27 is transmitted by the driving wheel 3 to the idle gear 5, the idle bodies 17 of which transmit the drive force to the countershaft 4 and to the countershaft gear 6, wherefrom the drive force is transmitted by the driven gear 2 to the hub 7 of the carrier 8, wherefrom the transmission of the drive power is transmitted by the shoe 10 to the output shaft 1 by the engagement edge 22 of the regulating carrier member 11 so that at the place of contact of the carrier element 9 with the engagement edge 22 of the regulating carrier 11 the drive force from the transmission gear (multiplied with respect to the drive force on the circumference of the drum by the transmission ratio) reacts on the shoes 10 with a return force proportional to the magnitude of the drive force at the output from the transmission and received by the rest surface 24 of the regulating carrier member 11. In consequence thereof at the begin of gear change due to contact of the lining 25 of the shoes 10 with the working surface 26 of the drum 27 the equilibrium of centrifugal forces of the shoes 10 with return forces by springs 31 acting on the shoes 10 takes place at the speed $v_1$ of the vehicle, which increases with the load of the motor.

At constant motor load and increase of the speed of the vehicle above $v_1$, part of the drive force proportional to the excess of the centrifugal force upon the shoes 10 over the return forces, is transmitted from the drum 27 by the sliding gear change clutch 12 directly to the carrier 8 and the rest of the drive force from the drum 27, transmitted to the driving wheel 3 and multiplied by the transmission ratio of the transmission gear, is transmitted via the hub 7 to the carrier 8, with the result, that the overall drive force received by the regulating carrier member 11 from the carrier 8 is reduced and the return force of the regulating carrier member 11 acting on the shoes 10 is also lowered proportionally up to a moment, where at a speed $v_2$ of the vehicle the gear change clutch 12 due to increased centrifugal force of the shoes 10 and increased return force acting on the shoes 10 of the regulating carrier member 11 transmits the whole drive force from the motor to the drum 27.

The speed $v_2$ of the vehicle is variable with the load of the motor analogically to the course of the speed $v_1$ of the vehicle. This first phase of gear change, which takes place in the course of increased speed of the motor in dependence on the speed of the vehicle proportionally to the transmission ratio of the lower transmission stage within the speed range $v_1$ to $v_2$ of the vehicle, can be reduced by adjustment of orientation of the engagement edge 22 of the regulating carrier member 11 and of the drive of shoes 10 up to a condition $v_1=v_2$, i.e., the first phase of gear change takes practically place at unchanged speed of the vehicle. After an increase of the speed of the vehicle to the speed $v_2$, the countershaft 4 starts to rotate together with the output shaft 1 quicker than the idle gear wheel 5 connected to the motor and the effect of the centrifugal force of the shoes 10 is increasing at lowering rotating speed of the motor in the second phase of gear shift which proceeds from the speed $v_2$ of the vehicle to the speed $v_3$ at firmly connected gear change clutch 12.

A possible increase of the drive power supplied by the motor at lowered speeds of the motor, depending on the course of characteristic curves of the motor within the range of speed of the second phase of gear shifting together with an increase of the drive power due to change of energy of slowed-down rotating masses of the motor in the course of the second phase of gear shifting, causes an increase of the return force of the regulating carrier member 11 on the shoes 10. The second phase of gear shifting, at which the rate of reduction of the speed of the motor is decisive for a continuous gear shifting, proceeds continuously even in case of unsuitable characteristic curves of the motor for common transmission gears from the point of view of continuity of gear shifting. Within the speed range of the vehicle from the speed $v_p$ where the centrifugal force of the shoes 10 is at zero load of the motor in equilibrium with return forces of the springs 31 up to the speed $v_1$ of the vehicle at full load of the motor, the "kick-down" effect can be utilized, since the gear change to a lower transmission stage by increased motor load at practically unchanged speed of the vehicle is advantageous.

With the transmission of the invention, the "kick-down" effect is different from known embodiments of automobile transmissions, since with transmission of the invention there is no interruption at any time of the transmission of the drive force from the motor to the driving wheel or wheels of the vehicle, because in case of an increase in load from a partial load of the motor (in the initial range of the vehicle speed $v_p$ to $v_l$) toward full motor load, after the required increase of motor load first the drive force transmitted by the gear change clutch 12 is increased (at a higher transmission stage) up to the moment, where the increasing drive force transmitted by the regulating carrier member 11 achieves a value which causes an increase of the relative return power on the shoes 10. This reduces the excess of centrifugal force of the gear change shoes so far that the gear change clutch 12 is unable to transmit a further increase of drive power, the motor now turns more rapidly with a slipping gear change clutch 12 and continuously transmitting the same drive force. This condition continues until the speed of the motor increases until the speed of the idle wheel 5, which is rotatably connected with the motor through the transmission, achieves the speed of the countershaft 4 which is rotatably connected with the output shaft 1, and until this part of the drive power multiplied by the transmission ratio of the transmission gear, starts to be transmitted to the carrier 8. At such condition this increased return force of the regulating carrier member 11 overcomes the centrifugal force of the shoes 10 and interrupts the contact of the lining 25 with the working surface 26 of the drum 27, whereby the drive force is furthermore transmitted at a lower transmission stage.

The time required for change to a lower transmission stage by increase of the motor load without change of the vehicle speed is indirectly proportional to the amount of increase of the motor load; this is advantageous from the point of view of active safety of operation in a given situation of operation. Contray to the case of a reduction of motor load within the speed range $v_p$ to $v_1$, it is possible to change from a lower transmission stage to a higher one, as the reduction of the force received from the transmission gear after reduction of the motor load reduces the return force of the regulating carrier member 11 on the shoes 10 of the gear change clutch 12 to such an extent that the gear change clutch 12 is disconnected by the action of the centrifugal force of the shoes 10 and the higher transmission stage is cut in practically instantaneously and without a change of the vehicle speed.

In case of a correct adjustment of the orientation of the driving edge 23 of the regulating carrier member 11 with respect to the suspension of shoes 10 on the carrier 8, taking into account the coefficient of friction of the lining 25, the force transmitted by the transmission gear by the output shaft 1 in case of a forward movement of the vehicle (braking by the motor or starting of the motor by pulling the vehicle) is transmitted from the regulating carrier member 11 by the driving edge 23 to the carrier elements 9 of the shoes 10 so that they press the shoe 10 by way of the lining 25 to the working surface 26 of the drum 27 and firmly connect the drum 27 of the gear change clutch 12 with the output shaft 1. If the vehicle speed is sufficient for operating the starting clutch 30, than the motor is firmly connected with the driving wheel or wheels of the vehicle in the case of braking or starting the motor by pulling the vehicle at a higher transmission stage of the vehicle.

The driving force $P_H=P_f+P_w$, where $P_f$ equals the frictional resistance of the vehicle, and $P_w$ equals the air resistance of the vehicle. In the upper part of FIG. 1 the course of the driving force $P_H$ on the driving wheels of the vehicle, transmitted by the transmission gear for different motor loads in dependence on the speed of the vehicle, is divided into three ranges.

As shown in FIG. 1, in the first range, from a zero speed of the vehicle up to the exponential curve, designated as efficiency (solely efficiency with respect to losses of power due to slipping of the gear change clutch 12) $\eta=1$, the lower transmission stage is operative. The exponential curve $\eta=1$ is the border line of the range in which the drive power is transmitted without slipping of the gear change clutch 12, which is disengaged within this range. In the lower transmission stage, the drive power $P_H$ is proportional to the motor load. The speed $v_1$ on the curve $\eta=1$ indicates the speed $v_1$ of the vehicle for different drive powers at the start of gear change, which for a zero load is equal to $v_p$ and for the maximum motor load is equal to the speed $v_1$.

Within the range of the exponential curve designated by $\eta=1$ and $\eta=0.666$ the first phase of gear change takes place with a slipping of the gear change clutch 12 in the course of efficiences $\eta=0.9$; $\eta=0.8$; and $\eta=0.7$, such curves showing the drive power $P_H$ as a function of the speed v of the vehicle.

The drive power $P_H$ in the second phase of gear change proceeds along a curve designated by $\eta=0.666$ to 1 within the range of speeds $v_2$ to $v_3$ of the vehicle for different motor loads. In FIG. 1 only the speeds $v_2$ and $v_3$ at full motor load are shown. The efficiency of the transmission of power by the transmission increases from the value $\eta=0.666$ (for a transmission ratio 1.5) at the speed $v_2$ of the vehicle up to the value $\eta=1$, at the speed $v_3$ of the vehicle.

Within the range from the exponential curve designated by $\eta=0.666$ up to 1 in the direction toward higher speeds of the vehicle a higher transmission stage is cut in at a now firmly connected gear change clutch 12.

The decrease of speed of the motor in the second phase of gear change from the course of revolutions at a lower operative transmission stage, designated in the lower part of FIG. 1 by 1°, to the course of motor speeds with a higher operative shage, designated in FIG. 1 by 2° is in FIG. 1 bordered by the respective speeds $v_2$ and $v_3$ solely for full motor load; at partial loads the decrease of motor speeds is shown at the shifting of corresponding speeds of the vehicle without designation. With previously known embodiments of automatic transmission gears with centrifugal gear change clutches, on the other hand, the slipping of the gear change clutch for the same decrease of revolutions of the motor in the second phase of gear change will start at the speed $v_p$ of the vehicle.

As above indicated, the multistage automatic countershaft transmission according to this invention is suitable for use in motor vehicles, and particularly single track vehicles such as motorcycles, scooters, mopeds, and the like.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A multistage automatic countershaft transmission mechanism, comprising a support frame, a drive shaft, an output shaft and a countershaft all rotatably mounted on said support frame, a centrifugal gear change clutch having a drum coaxially mounted relative to said output shaft, said drum having a working surface, at least one centrifugally actuated shoe adapted to engage said working surface; a hub rotatably coaxially supported on said output shaft, a driven gear fixed to said hub, a driving gear fixedly connected to said drum, said drum being freely rotatably supported on said hub, an idle gear freely rotatably supported on the countershaft, a countershaft gear fixed to the countershaft, the driving gear operatively engaging the idle gear, carrier means of the gear change clutch fixed on the hub and adapted to operatively support said centrifugally actuated shoes, said carrier means having at least one carrier element operatively connected to said shoes, a regulating carrier fixed to the output shaft, the regulating carrier having an engagement edge, a driving edge and a rest surface which are adapted to be selectively operatively engaged by said carrier element.

2. The multistage automatic countershaft transmission mechanism as set forth in claim 1, further comprising a starting gear freely rotatably supported on the countershaft, a starting device operatively engaging said starting gear, said idler gear having a recess, the starting gear being provided with at least one disengagement stud axially projecting therefrom which engages into said recess of said idle gear, at least one idle body and at least one spring loaded pin operatively mounted in said recess of said idle gear, said idle body separating the disengagement stud from said spring loaded pin.

3. The multistage automatic countershaft transmission mechanism as set forth in claim 1, wherein said regulating carrier is fixedly mounted on said output shaft and is adapted to axially guide the shoes of the gear change clutch, said carrier element being fixedly connected to the shoe and comprising guiding surfaces resting against the regulating carrier.

* * * * *